(12) United States Patent
Chiang et al.

(10) Patent No.: US 8,059,093 B2
(45) Date of Patent: Nov. 15, 2011

(54) WIRELESS MOUSE HAVING STORING STRUCTURE FOR STORING WIRELESS SIGNAL RECEIVER THEREIN

(75) Inventors: Hsiao-Lung Chiang, Taipei (TW); Chi-Lung Liu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 814 days.

(21) Appl. No.: 11/952,863

(22) Filed: Dec. 7, 2007

(65) Prior Publication Data
US 2008/0266259 A1 Oct. 30, 2008

(30) Foreign Application Priority Data
Apr. 27, 2007 (TW) .............................. 96114909 A

(51) Int. Cl.
*G09G 5/08* (2006.01)
*A63F 13/00* (2006.01)
(52) U.S. Cl. ........... 345/163; 463/37; 345/156; D14/402
(58) Field of Classification Search .......... 345/156–157, 345/163; 463/37, 39, 46; D14/356, 388, D14/402
See application file for complete search history.

(56) References Cited

U.S. PATENT DOCUMENTS

| | | | |
|---|---|---|---|
| 2005/0057506 A1* | 3/2005 | Chi | 345/163 |
| 2005/0146504 A1* | 7/2005 | Huang et al. | 345/163 |
| 2006/0038782 A1* | 2/2006 | Lo | 345/163 |
| 2006/0274043 A1* | 12/2006 | Lu | 345/163 |

* cited by examiner

*Primary Examiner* — Lun-Yi Lao
*Assistant Examiner* — Jarurat Suteerawongsa
(74) *Attorney, Agent, or Firm* — Kirton & McConkie; Evan R. Witt

(57) ABSTRACT

The present invention relates to a wireless mouse having a storing structure for storing a wireless signal receiver therein. The wireless mouse includes an upper housing, a wireless signal receiver, a lower housing and a torsion spring. The lower housing has a depression structure for receiving the wireless signal receiver therein. A perforation is disposed in a sidewall of the lower housing and communicated with the depression structure. Due to the torsional force resulting from said torsion spring, the wireless signal receiver is clasped and fixed in the depression structure.

2 Claims, 5 Drawing Sheets

WIRELESS MOUSE HAVING STORING STRUCTURE FOR STORING WIRELESS SIGNAL RECEIVER THEREIN

FIELD OF THE INVENTION

The present invention relates to a wireless mouse, and more particularly to a wireless mouse having a storing structure for storing a wireless signal receiver therein.

BACKGROUND OF THE INVENTION

Nowadays, mice, keyboards and earphones become essential peripheral devices of computer systems. Conventionally, these peripheral devices are communicated with the host computer via wire linkage. The wire linkage is very troublesome and inconvenient because an additional signal wire is employed to connect the computer with the peripheral device. For solving these drawbacks, wireless peripheral devices are developed to communicate with the host computer according to a wireless transmission technology. Since no additional wire is required to connect the wireless peripheral devices with the host computer, the space utilization is enhanced.

Take a wireless mouse for example. The signals generated from the wireless mouse are transmitted to the host computer according to wireless communication protocol. The wireless mouse has a wireless emitter therein for emitting a wireless signal. When the wireless mouse is operated, a corresponding wireless signal receiver is used for receiving the wireless signal issued from the wireless mouse. Nowadays, with increasing development of wireless communication technologies, the volume of the wireless signal receiver is largely reduced and convenient for portability. Due to the reduced volume, the probability of losing the wireless signal receiver is increased. For a purpose of solving such a problem, it is important to provide a storing structure for storing a wireless signal receiver therein.

Please refer to FIG. 1, which is a schematic perspective view illustrating a wireless mouse having a storing structure for storing a wireless signal receiver therein. The upper housing 1 of the wireless mouse may be uplifted to accommodate the wireless signal receiver 2 into the receiving portion thereof. Generally, the upper housing and the lower housing of the wireless mouse are combined via corresponding studs and screws. Before wireless signal receiver 2 is accommodated within the receiving portion, the upper housing should be detached from the lower housing to expose the receiving portion. If the process of removing/inserting the wireless signal receiver from/into the receiving portion of the wireless mouse is repeatedly done for a long term, the studs may be abraded. Due to the reduced strength of the studs, the upper housing is no longer secured fixed on the lower housing vie the studs. Moreover, frequent operations of detaching the upper housing from the lower housing are not user-friendly.

FIG. 2 is a schematic perspective view of another wireless mouse having a storing structure for storing a wireless signal receiver therein. The wireless mouse 3 has a receiving portion 4 for accommodating the wireless signal receiver 5 therein. After the wireless signal receiver 5 is detached from the wireless mouse 3, an entrance of the receiving portion 4 is exposed. The entrance of the receiving portion 4 is detrimental to the overall aesthetic appearance of the wireless mouse 3. If no additional sheltering door is used for sheltering the entrance of the receiving portion 4, the inner components of the wireless mouse 3 are possibly contaminated. Moreover, for fixing the receiving portion 4 in the receiving portion 4, a fixing element such as a doorlock element is disposed in the receiving portion 4. After the wireless signal receiver 5 is accommodated within the receiving portion 4, the wireless signal receiver 5 is clasped and fixed by the doorlock element. For withdrawing the wireless signal receiver 5, the doorlock element is disengaged from the receiving portion 4 by exerting an external force toward the doorlock element. Since the doorlock element is not cost-effective, the cost of the whole wireless mouse is increased.

Therefore, there is a need of providing a wireless mouse having a storing structure for storing a wireless signal receiver therein, in which the storing structure has an aesthetic appearance and is cost-effective.

SUMMARY OF THE INVENTION

It is an object of the present invention to provide a wireless mouse having a storing structure for storing a wireless signal receiver therein. By means of a door piece and a torsion spring, the wireless mouse has an aesthetic appearance and is cost-effective.

In accordance with an aspect of the present invention, there is provided a wireless mouse having a storing structure for storing a wireless signal receiver therein. The wireless mouse includes an upper housing, a wireless signal receiver, a lower housing, a retaining piece, a door piece and a torsion spring. The lower housing has a depression structure for receiving the wireless signal receiver therein. A perforation is disposed in a sidewall of the lower housing and communicated with the depression structure. The retaining piece is disposed on a bottom surface of the depression structure. The door piece includes a rotating shaft pivotally coupled to the lower housing and a door body sheltering the perforation. The torsion spring includes a first spring arm, a second spring arm and a spiral part. The spiral part is sheathed around the rotating shaft of the door piece. The first spring arm is sustained against the door body of the door piece. The second spring arm is sustained against the upper housing.

In an embodiment, the wireless mouse further includes a battery cover pivotally coupled to the lower housing.

In an embodiment, the battery cover includes a notch aligned with the perforation.

In an embodiment, the wireless signal receiver has a rib exposed to the perforation.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
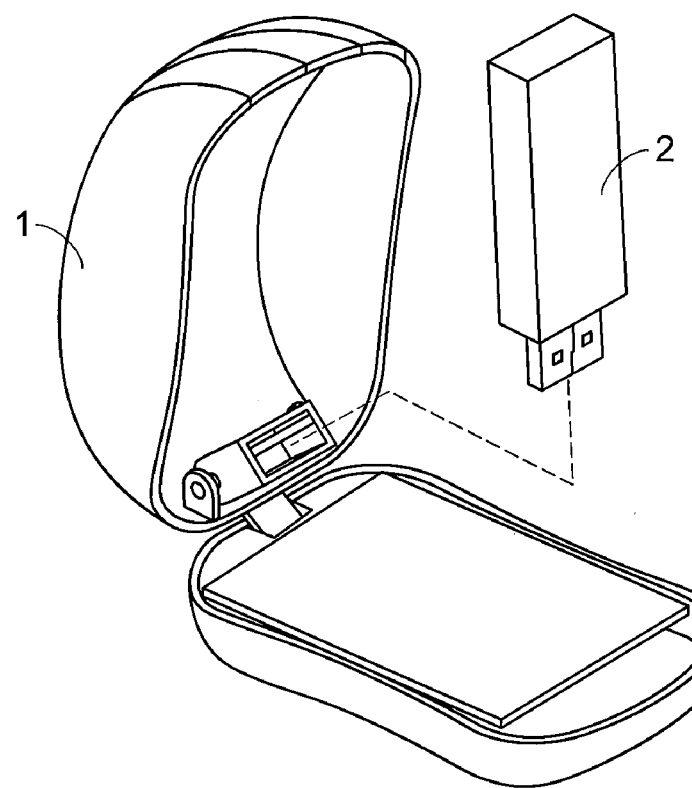
FIG. 1 is a schematic perspective view illustrating a wireless mouse having a storing structure for storing a wireless signal receiver therein according to prior art.
Figure 2:
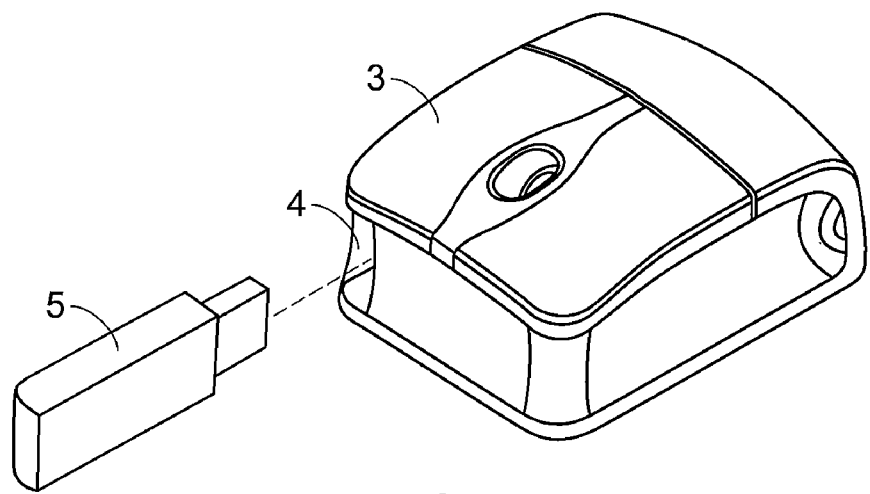
FIG. 2 is a schematic perspective view of another wireless mouse having a storing structure for storing a wireless signal receiver therein according to prior art.
Figure 3:
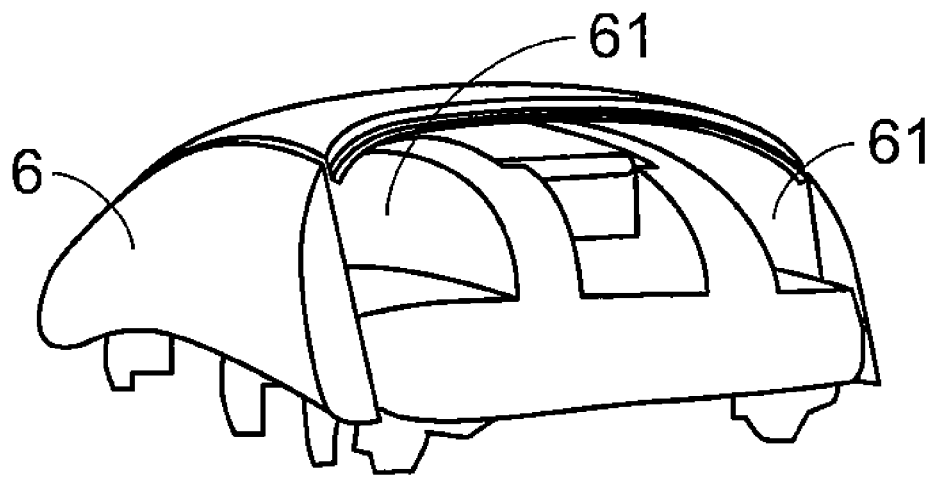
FIG. 3 is a schematic exploded view illustrating the outer components of a wireless mouse according to a preferred embodiment of the present invention.
Figure 3:
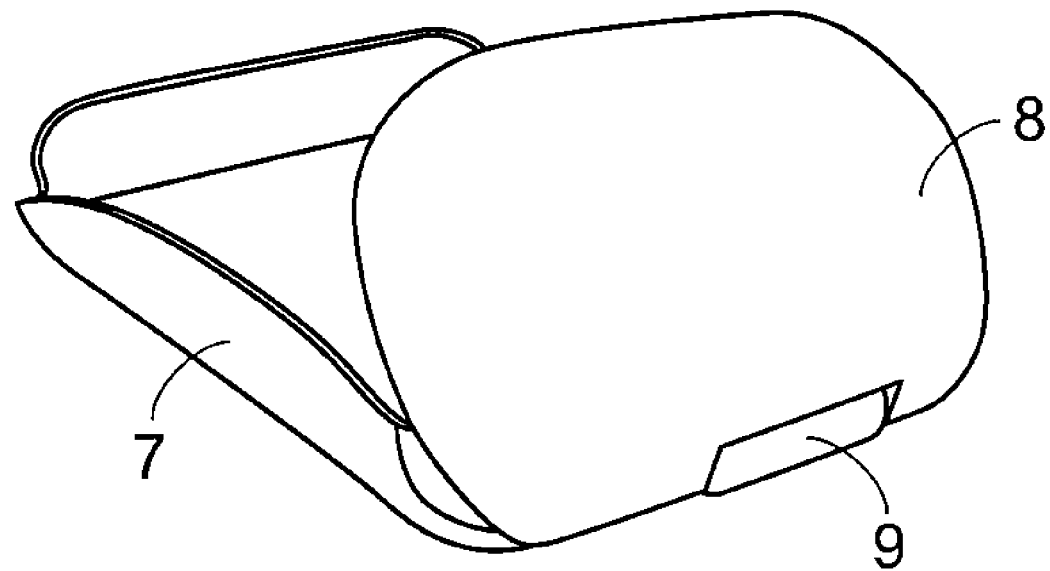

Please refer to FIG. 3, which is a schematic exploded view illustrating the outer components of a wireless mouse according to a preferred embodiment of the present invention. The wireless mouse has a storing structure for storing a wireless signal receiver therein. The outer components of the wireless mouse principally include an upper housing 6, a lower housing 7, a battery cover 8 and a door piece 9. A battery receptacle 61 is disposed in the inner surface of the upper housing 6 for receiving a battery (not shown) therein. The battery cover 8 is pivotally coupled to the lower housing 7. The battery cover 8 is selectively opened or closed to expose or shelter the battery receptacle 61. In addition, the battery cover 8 has a notch 81 (shown in FIG. 7) at the bottom edge thereof.

Figure 4:
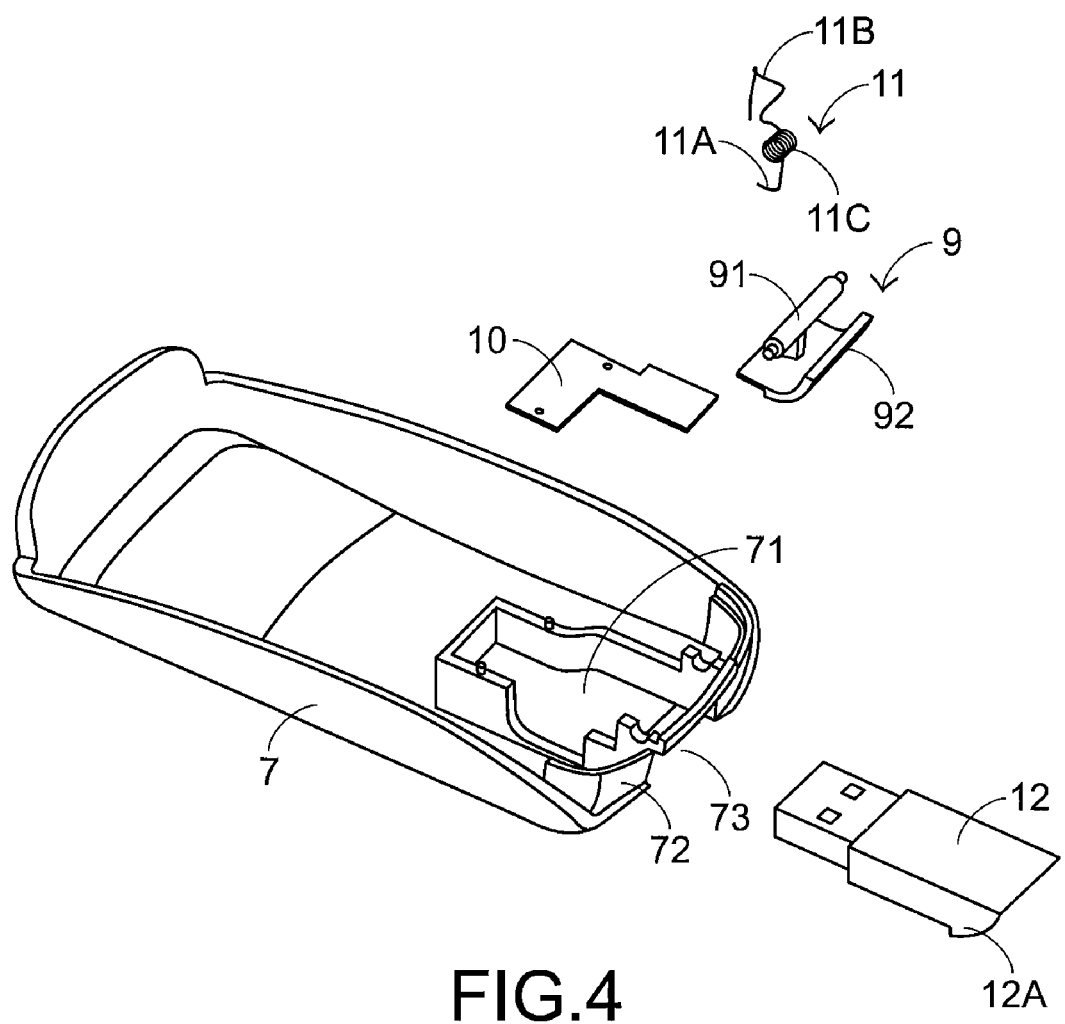
FIG. 4 is a schematic exploded view illustrating the inner components of the wireless mouse of FIG. 3.

FIG. 4 is a schematic exploded view illustrating the inner components of the wireless mouse of FIG. 3. As shown in FIG. 4, the lower housing 7 includes a depression structure 71 for receiving a wireless signal receiver 12 therein. A perforation 73 is disposed in a sidewall 72 of the lower housing 7 and communicated with the depression structure 71. The inner components of the wireless mouse further include a retaining piece 10 and a torsion spring 11. The torsion spring 11 includes a first spring arm 11A, a second spring arm 11B and a spiral part 11C. The door piece 9 includes a rotating shaft 91 and a door body 92. Moreover, the wireless signal receiver 12 has a rib 12A.

Figure 5:
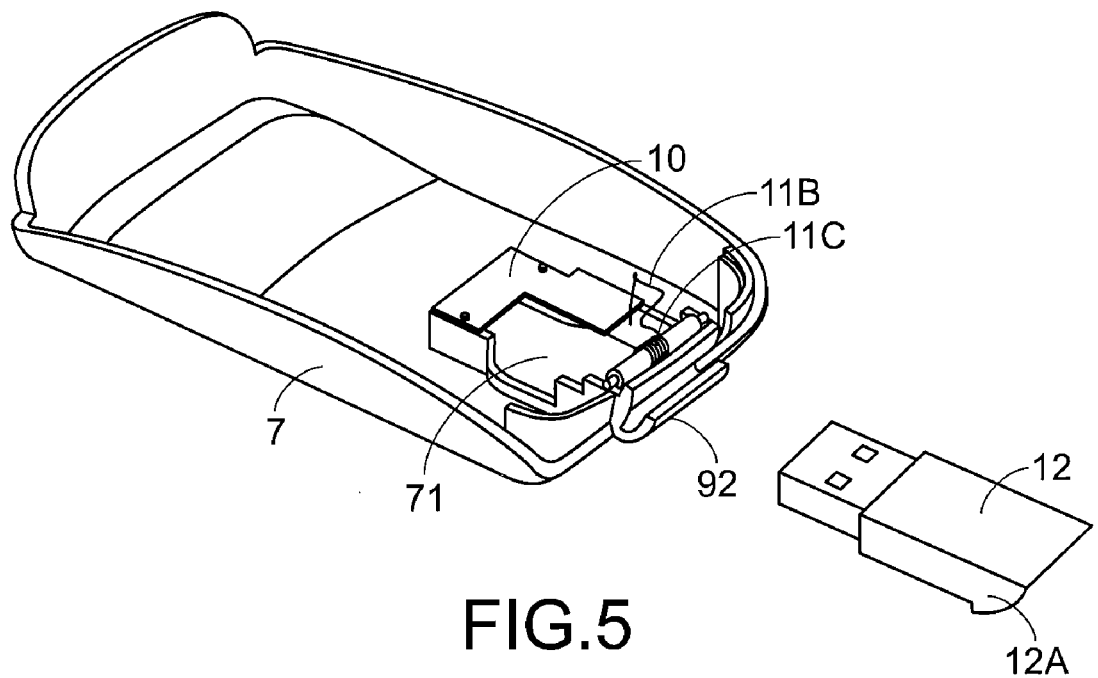
FIG. 5 is a schematic assembled view of the wireless mouse of FIG. 4.

Referring to FIG. 5, a schematic assembled view of the wireless mouse of FIG. 4 is illustrated. In FIG. 5, the wireless signal receiver 12 has not yet accommodated within the storing structure of the wireless mouse. Hereinafter, the relative connections and functions of some important components of the wireless mouse are illustrated as follows with reference to FIGS. 4 and 5. The retaining piece 10 is disposed on the depression structure 71. After the wireless signal receiver 12 is received in the depression structure 71, the retaining piece 10 may facilitate positioning the wireless signal receiver 12 in the depression structure 71. The spiral part 11C of the torsion spring 11 is sheathed around the rotating shaft 91 of the door piece 9. Under this circumstance, the first spring arm 11A is sustained against the door body 92 of the door piece 9, and the second spring arm 11B is sustained against the inner surface of the upper housing 6. For clarifying the inner components of the wireless mouse, the upper housing 6 is not shown in this drawing. Since both ends of the rotating shaft 91 are pivotally coupled to the lower housing 7, the door piece 9 is rotatable with respect to the rotating shaft 91. Since the first spring arm 11A is sustained against the door body 92 of the door piece 9, the perforation 73 at the sidewall 72 of the lower housing 7 is sheltered by the door body 92.

Figure 6:
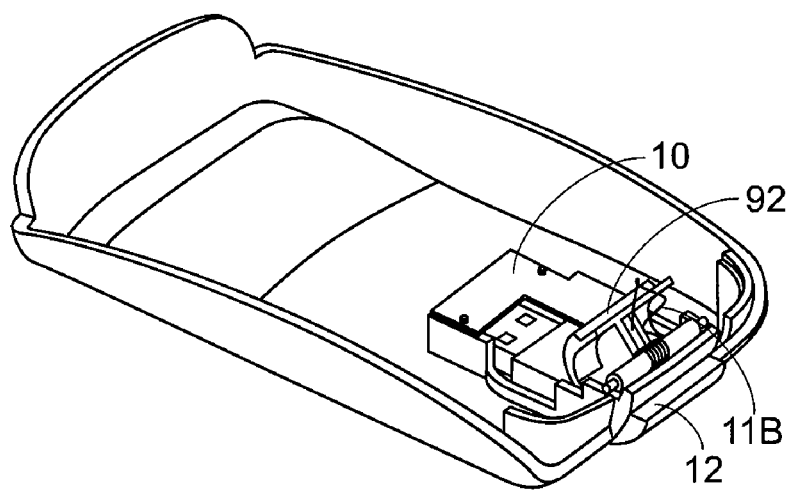
FIG. 6 is a schematic view illustrating that the wireless signal receiver has been stored within the wireless mouse.

FIG. 6 is a schematic view illustrating that the wireless signal receiver has been stored within the wireless mouse. For storing the wireless signal receiver 12, the wireless signal receiver 12 is inserted into the depression structure 71 of the lower housing 7 through the perforation 73. During the process of moving the wireless signal receiver 12 into the depression structure 71, the door body 92 of the door piece 9 is contacted with and uplifted by the wireless signal receiver 12. Until the wireless signal receiver 12 is fully received in the depression structure 71, the wireless signal receiver 12 is suppressed by the door body 92 of the door piece 9 due to a torsional force resulted from the torsion spring 11. Meanwhile, the wireless signal receiver 12 will not be detached from the depression structure 71.

Moreover, when the wireless signal receiver 12 is accommodated within the wireless mouse, the rib 12A is exposed to the perforation 73. For withdrawing the wireless signal receiver 12 from the wireless mouse, a tiny external force is required to exert on the rib 12A to move the wireless signal receiver 12 out of the wireless mouse. After the wireless signal receiver 12 is withdrawn from the wireless mouse, the perforation 73 is sheltered by the door body 92 of the door piece 9 due to the torsional force resulted from the torsion spring 11.

Figure 7:
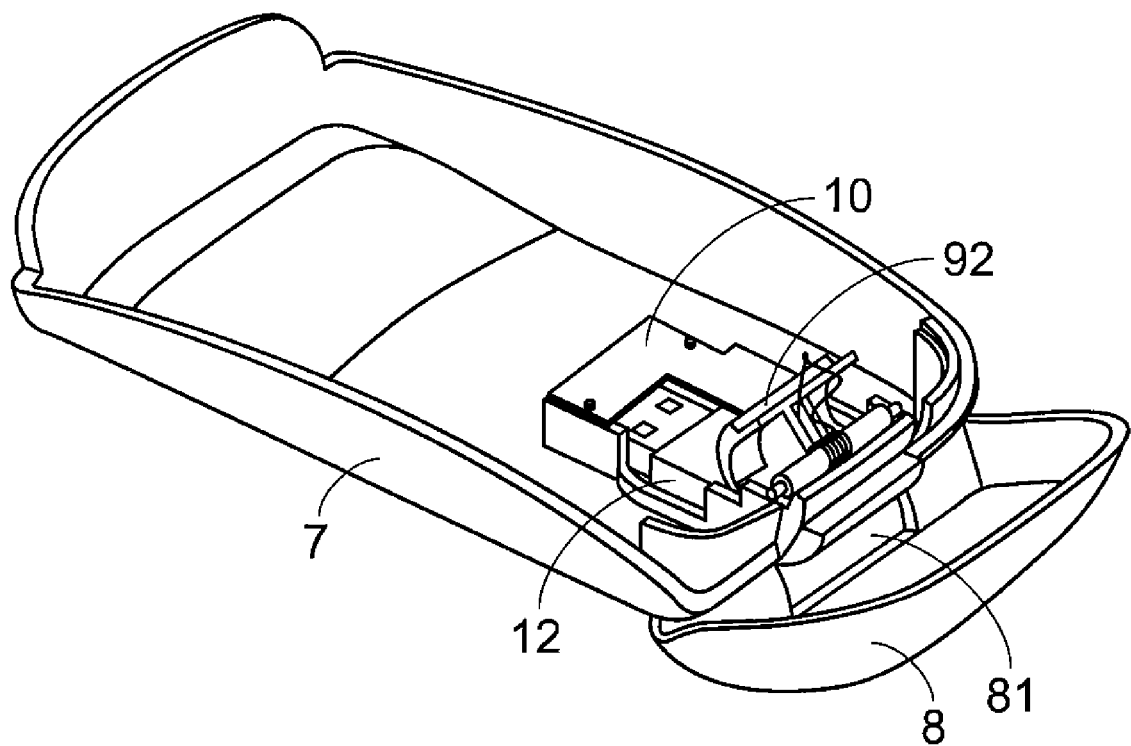
FIG. 7 is a schematic view illustrating a battery cover pivotally coupled to the lower housing.

Referring to FIG. 7, the battery cover 8 is pivotally coupled to the lower housing 7. The battery cover 8 and the perforation 73 are disposed on the same side of the wireless mouse. For avoiding detrimental interaction between the action of opening the battery cover 8 and the action of storing the wireless signal receiver 12, the notch 81 of the battery cover 8 is aligned with the perforation 73. Under this circumstance, the perforation 73 will not be sheltered by the battery cover 8 even when the battery cover 8 is opened.

From the above description, the storing structure of the wireless mouse according to the present invention may facilitate a user to insert/withdraw the wireless signal receiver into/from the receiving portion. Due to the torsional force resulted from the torsion spring, the perforation may be sheltered by the door body of the door piece after the wireless signal receiver is withdrawn from the wireless mouse. As a consequence, the aesthetic appearance of the wireless mouse is enhanced. Moreover, since the torsional force resulted from the torsion spring facilitates suppressing the wireless signal receiver, the wireless signal receiver will be fixed within the wireless mouse without any additional doorlock element.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wireless mouse having a storing structure for storing a wireless signal receiver therein, said wireless mouse comprising:
    an upper housing;
    a wireless signal receiver;
    a lower housing having a depression structure for receiving said wireless signal receiver therein, wherein a perforation is disposed in a sidewall of said lower housing and communicated with said depression structure, wherein said wireless signal receiver has a rib on an exterior surface thereof, and wherein when said wireless signal receiver is disposed within said depression structure, said rib is exposed to said perforation and provides a release structure to withdraw said wireless signal receiver from said depression structure upon exerting an external force by a user;
    a battery cover coupled to said lower housing, wherein said battery cover includes a notch aligned with said perforation;
    a retaining piece disposed on said depression structure;
    a door piece including a rotating shaft pivotally coupled to said lower housing and a door body sheltering said perforation; and
    a torsion spring including a first spring arm, a second spring arm and a spiral part, wherein said spiral part is sheathed around said rotating shaft of said door piece, said first spring arm is sustained against said door body of said door piece, and said second spring arm is sustained against said upper housing, wherein said torsion spring produces a torsional force on said door body to fix said wireless signal receiver within said depression structure.

2. The wireless mouse according to claim 1 wherein the battery cover is pivotally coupled to said lower housing.

* * * * *